United States Patent
Rakshit et al.

(10) Patent No.: US 10,834,456 B2
(45) Date of Patent: Nov. 10, 2020

(54) INTELLIGENT MASKING OF NON-VERBAL CUES DURING A VIDEO COMMUNICATION

(71) Applicant: International Business Machines Corporation, Armonk, NY (US)

(72) Inventors: Sarbajit K. Rakshit, Kolkata (IN); John M. Ganci, Jr., Raleigh, NC (US); James E. Bostick, Cedar Park, TX (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/367,850

(22) Filed: Mar. 28, 2019

(65) Prior Publication Data
US 2020/0314483 A1 Oct. 1, 2020

(51) Int. Cl.
H04N 21/431 (2011.01)
H04N 7/14 (2006.01)
H04N 7/15 (2006.01)

(52) U.S. Cl.
CPC ......... H04N 21/4318 (2013.01); H04N 7/141 (2013.01); H04N 7/157 (2013.01)

(58) Field of Classification Search
CPC .................................................. H04N 7/157
See application file for complete search history.

(56) References Cited

U.S. PATENT DOCUMENTS

| 7,564,476 | B1 | 7/2009 | Coughlan |
| 9,269,374 | B1 | 2/2016 | Conway |
| 9,405,962 | B2 | 8/2016 | Balasubramanian |
| 9,479,696 | B1* | 10/2016 | Miller ............. G06F 3/04883 |
| 2006/0190962 | A1* | 8/2006 | Kim ................. H04N 7/0887 725/25 |
| 2009/0079816 | A1* | 3/2009 | Qvarfordt ......... G06K 9/00335 348/14.16 |

(Continued)

FOREIGN PATENT DOCUMENTS

WO    2014022022 A1    2/2014

OTHER PUBLICATIONS

"IBM Connections Meetings Cloud", IBM, printed from the Internet Jan. 10, 2019, 1 pp., <https://www.ibm.com/us-en/marketplace/online-meetings>.
"IBM MobileFirst", IBM, printed from the Internet Jan. 10, 2019, 7 pps., <https://www.ibm.com/mobilefirst/in/en/offerings>.
"IBM Watson Knowledge Catalog", IBM, printed from the Internet Jan. 10, 2019, 7 pps., <https://www.ibm.com/cloud/watson-knowledge-catalog>.

(Continued)

*Primary Examiner* — Phi Hoang
(74) *Attorney, Agent, or Firm* — Marcus Walker

(57) ABSTRACT

Aspects of the present invention disclose a method, computer program product, and system for masking a non-verbal cue. The method includes one or more processors identifying a user within streaming data of a video communication. The method further includes identifying a non-verbal cue by the user included in the streaming data of the video communication. The method further includes determining whether the identified non-verbal cue corresponds to an excluded category of actions for the video communication. The method further includes in response to determining that the identified non-verbal cue corresponds to an excluded category of actions for the video communication, masking the identified non-verbal cue by overlaying a substitute representation of the user over the user in the streaming data of the video communication.

20 Claims, 3 Drawing Sheets

(56) References Cited

U.S. PATENT DOCUMENTS

| | | | | |
|---|---|---|---|---|
| 2009/0300513 | A1* | 12/2009 | Nims | A63F 13/53 |
| | | | | 715/747 |
| 2010/0146583 | A1 | 6/2010 | Prehofer | |
| 2010/0250703 | A1* | 9/2010 | Steadman | H04H 60/04 |
| | | | | 709/217 |
| 2012/0232966 | A1 | 9/2012 | Calman | |
| 2014/0376785 | A1 | 12/2014 | Bathiche | |
| 2015/0213604 | A1* | 7/2015 | Li | G06K 9/00315 |
| | | | | 345/473 |
| 2015/0381938 | A1 | 12/2015 | Cunico | |
| 2016/0217621 | A1* | 7/2016 | Raghoebardajal | G06T 19/006 |
| 2017/0154211 | A1 | 6/2017 | Shaburov | |
| 2017/0332044 | A1* | 11/2017 | Marlow | H04L 65/1089 |
| 2018/0089163 | A1* | 3/2018 | Ben Ami | G06F 40/20 |
| 2018/0120928 | A1* | 5/2018 | Hayashida | G06F 3/011 |
| 2019/0004639 | A1* | 1/2019 | Faulkner | H04L 67/38 |
| 2019/0279639 | A1* | 9/2019 | Ginsberg | G06N 5/02 |
| 2020/0164278 | A1* | 5/2020 | Andre | H04L 51/12 |

OTHER PUBLICATIONS

"Technology Consulting and Services for Enterprises", IBM, printed from the Internet Jan. 10, 2019, 8 pps., <https://www.ibm.com/services/technology>.

"This AI Can Create Fake Videos that Look Real", Copyright ©, Futurism, LLC, Jul. 17, 2017, 2 pps., <https://futurism.com/videos/this-ai-can-create-fake-videos-that-look-real/>.

"Virtual Background", Copyright © 2019 Zoom Video Communications, Inc., printed from the Internet Jan. 10, 2019 6 pps., <https://support.zoom.us/hc/en-us/articles/210707503-Virtual-Background>.

"Visual Recognition", IBM, printed from the Internet Jan. 10, 2019, 5 pps., <https://www.ibm.com/watson/services/visual-recognition/>.

"Watson Personality Insights", IBM, printed from the Internet Jan. 10, 2019, 3 pps., <https://www.ibm.com/cloud/watson-personality-insights>.

* cited by examiner

INTELLIGENT MASKING OF NON-VERBAL CUES DURING A VIDEO COMMUNICATION

BACKGROUND OF THE INVENTION

The present invention relates generally to the field of streaming intelligence, and more particularly to masking non-verbal cues of a user.

In recent years, developments in streaming media have created the ability of users participating in a video call to view each other on a real-time basis. Web conferencing is an online service made possible by Internet technologies (e.g., TCP/IP connections). Web conferencing allows for users to share text-based messages, voice, and video simultaneously, across geographically dispersed locations. Web conferencing has many applications and is a catalyst in the growth of online collaborative services.

Visual recognition is the ability of software to identify objects, places, people, and/or actions in images. Computers can use image recognition in combination with hardware (e.g., cameras) and cognitive systems to realize visual recognition. Visual recognition may be utilized to catalog behavior and reconstruct an object present in multiple images.

Three-dimensional reconstruction (3D reconstruction) is the process of capturing the shape and appearance of real objects. There are multiple methods of reconstructing a three-dimensional image of an of object, some using a single image and others using multiple. For instance, the monocular cues method uses images from a viewpoint to derive characteristics (e.g., shading, texture, silhouettes, etc.) of 2D images to measure a 3D shape of an object. Another method is the binocular stereo vision method, which method uses 3D geometric information of an object from multiple images derived from a visual recognition system and the results are presented in the form of a depth map.

SUMMARY

Aspects of the present invention disclose a method, computer program product, and system for masking a non-verbal cue. The method includes identifying, by one or more processors, a user within streaming data of a video communication. The method further includes identifying, by one or more processors, a non-verbal cue by the user included in the streaming data of the video communication. The method further includes determining, by one or more processors, whether the identified non-verbal cue corresponds to an excluded category of actions for the video communication. The method further includes in response to determining that the identified non-verbal cue corresponds to an excluded category of actions for the video communication, masking, by one or more processors, the identified non-verbal cue by overlaying a substitute representation of the user over the user in the streaming data of the video communication.

DETAILED DESCRIPTION

Embodiments of the present invention allow for determining and automatically masking of a non-verbal cue of a user when on a video conference, when the non-verbal cue corresponds to a defined excluded category. Embodiments of the present invention determine whether a non-verbal cue of a user is within an excluded category based on historical analysis of captured data of video conferences and defined categories of non-verbal cues. Embodiments of the present invention determine a triggering event that correlates to a non-verbal cue of a user and can automatically filter ambient noise when the user is on a video conference. Embodiments of the present invention determine when the non-verbal cue of a user is no longer present in the video conference, and transitions from a masked representation of the user to a live video of the user.

Some embodiments of the present invention recognize that there is a need for an intelligent video conference system that is able to predict and mask certain non-verbal cues and ambient noise during a video conference with a substitute representation image of the user (e.g., with a three-dimensional image of a user, etc.). Consequently, embodiments of the present invention recognize that video conference systems do not possess the ability to predict and mask certain non-verbal cues of a user, and as a result non-verbal cues that can create a disruption, disturbance, or may be offensive are permitted to be viewed and heard by another participant in a video conference. For example, a coworker of a user says or does something that saddens the user who is posing a question to a presenter, and as a result the tone of the user has changed and the user is visibly sad, which raises the concern of other participants in a video call causing a disturbance. Various embodiments of the present invention solve this by utilizing cognitive analysis, visual recognition, and 3D reconstruction to detect triggering events, predict non-verbal cues and disruptions, and automatically mask the non-verbal cues and disruptions.

Embodiments of the present invention recognize that the present invention improves video conference systems by increasing the capabilities of a video conference system through the ability to predict and automatically mask non-verbal cues of a user in near or real-time. Additionally, various embodiments of the present invention improve the utilization of processor resources by detecting event triggers in a video conference and predicting non-verbal cues based on data of a repository, as opposed to analyzing the entire stream of data to detect and define event triggers and non-verbal cues to determine whether to mask a non-verbal cue. Thus, reducing the amount of processing resources used to analyze the stream of data of the video conference.

Implementation of embodiments of the invention may take a variety of forms, and exemplary implementation details are discussed subsequently with reference to the Figures.

Figure 1:
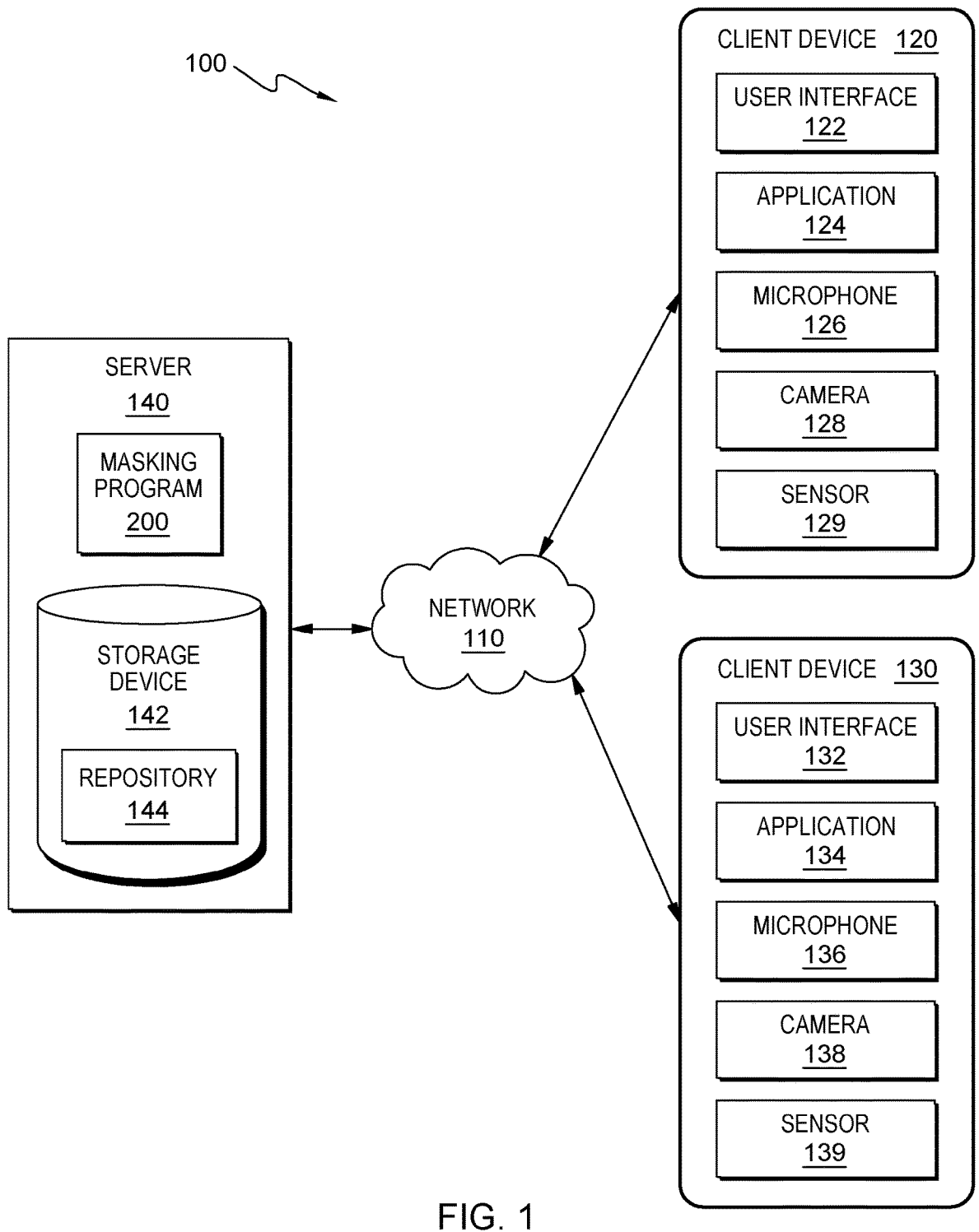
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In an embodiment, masking program 200 prompts users associated with client device 120 or client device 130 to determine whether the users grants masking program 200 access to data of client device 120 or client device 130 (i.e., users may opt-in) to collect information about the users store the collected information in storage device 142. For example, a user of client device 120 authorizes masking program 200 to utilize all information and data sources that are available for masking program 200 to access in client device 120. In another embodiment, masking program 200 prompts users associated with client device 120 or client device 130 to determine whether the users grants masking program 200 permission to use collected information of the associated with the users to identify and store publicly available information associated with the user. For example, utilize all information collected to identify information associated with the users to identify public profiles of media sites publicly available.

An embodiment of data processing environment 100 includes client device 120, client device 130, and server 140, all interconnected over network 110. In one embodiment, client device 120, client device 130, and server 140 communicate through network 110. Network 110 can be, for example, a local area network (LAN), a telecommunications network, a wide area network (WAN), such as the Internet, or any combination thereof, and include wired, wireless, or fiber optic connections. In general, network 110 can be any combination of connections and protocols, which will support communications between client device 120, client device 130, and server 140, in accordance with embodiments of the present invention. For example, a user of a mobile device (e.g., client device 120) and a user a laptop (e.g., client device 130) use the Internet (e.g., network 110) to connect to a video conference hosted on a server (e.g., server 140) and transmit and receive data to one another.

Client device 120 and client device 130 are representative of a device capable of executing computer readable program instructions. In various embodiments of the present invention, client device 120 and client device 130 may be a workstation, personal computer, digital video recorder, media player, personal digital assistant, mobile phone, or any other device capable of executing computer readable program instructions, in accordance with embodiments of the present invention. For example, client device 120 is a mobile device and client device 130 is a laptop, which are participating in a video conference. Client device 120 and client device 130 may include components as depicted and described in further detail with respect to FIG. 3, in accordance with embodiments of the present invention.

Client device 120 and client device 130 include respective instances of a user interface (i.e., user interface 122 and user interface 132), applications (i.e., application 124 and application 134), microphones (i.e., microphone 126 and microphone 136), cameras (i.e., camera 128 and camera 138), and sensors (i.e., sensor 129 and sensor 139), which each correspond to a respective device and can perform equivalent functions. In various embodiments of the present invention, a user interface is a program that provides an interface between a user of a device and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Client device 120 and client device 130 include respective instances of an application, which correspond to a respective device and can perform equivalent functions in the respective devices. In various embodiments of the present invention an application frequently serves to provide a user with similar services accessed on personal computers (e.g., web browser, video conference program, data syncing program, or other media, etc.). In one embodiment, a user utilizes application 124 to transfer and receive data to and from a user utilizing application 134. For example, a user uses a video conference program (e.g., application 124) of a mobile device (e.g., client device 120) to host a meeting with a user attending the meeting via a video conference program (e.g., application 134) of a laptop (e.g., client device 130). In another example, a user updates biometric data (e.g., vital signs recordings during a workout) to a mobile device (e.g., client device 120) from a sensor of the mobile device worn during the workout using a data syncing program (e.g., application 124).

Client device 120 and client device 130 include respective instances of a microphone, which corresponds to a respective device and can perform equivalent functions in the respective devices. In various embodiments of the present invention masking program 200 utilizes a microphone to capture audio from a user and detect ambient noises of an environment of the user. In one embodiment, masking program 200 captures audio of a user utilizing microphone 126 to transmit audio data to a user via application 124. For example, a user uses a microphone (e.g., microphone 126) of a mobile device (e.g., client device 120) to ask a question to another user participating in a live video call stream, who responds to the question using a microphone (e.g., microphone 136) of a laptop (e.g., client device 130). In this example, masking program 200 detects the audio of the exchange between the two users from the microphones of the mobile device and laptop of the users and stores the audio in a database (e.g., storage device 142). In another embodiment, masking program 200 utilizes microphone 126 to detect ambient noise in the environment of a user. For example, masking program 200 utilizes a microphone to detect an increase in ambient noise (e.g., words spoken by a roommate of a user while the user is participating in a live video call stream). In another example, masking program 200 utilizes a microphone to detect music playing in a room adjacent to where the user is participating in a video conference.

Client device 120 and client device 130 include respective instances of a camera, which corresponds to a respective device and can perform equivalent functions in the respective devices. In various embodiments of the present invention masking program 200 utilizes a camera to capture images of a user in a video conference and observe facial expressions, gestures, and body language of the user. In one embodiment, masking program 200 utilizes camera 128 to capture images of a user that the user transmits to one or more other users through application 124 (e.g., a video conference). For example, a user uses the camera (e.g., camera 128) of a mobile device (e.g., client device 120) to share video data that includes images of the user with one or more other users participating in a live video call stream. In this example, masking program 200 detects the camera is creating video data, identifies images of the user in the video data, and stores the images in a database (e.g., storage device 142). In another embodiment, masking program 200 utilizes camera 128 to capture non-verbal cues (e.g., facial expressions, gestures, body language, etc.) of a user. For example, a camera records a gesture of a user during a live video call stream, and masking program 200 stores images of the gesture in a database (e.g., storage device 142).

Client device 120 and client device 130 include respective instances of a sensor, sensor 129 and sensor 139, which corresponds to a respective device and can perform equivalent functions in the respective devices. In various embodiments of the present invention masking program 200 utilizes a sensor to collect biometric data of a user. In one embodiment, sensor 129 is located on client device 120 and sensor 139 is located on client device 130. In another embodiment, sensor 129 and sensor 139 are external to client device 120 and client device 130 and transmit biometric data through application 124 and application 134 to a respective device. For example, a user can wear a sensor that transmits vital signs (e.g., temperature, heart rate, respiratory rate, blood pressure, etc.) of the user to a mobile device (e.g., client device 120) through a data syncing program (e.g., application 124). In this example, masking program 200 detects that the sensor is receiving biometric data and stores the biometric data in a database (e.g., storage device 142).

Server 140 includes storage device 142, repository 144, and masking program 200. Storage device 142 can be implemented with any type of storage device, for example, persistent storage 305, which is capable of storing data that may be accessed and utilized by client device 120, client device 130 and server 140, such as a database server, a hard disk drive, or a flash memory. Storage device 142 stores numerous types of data which may include database or repository. In various embodiments of the present invention storage device 142 may include a plurality of databases that include defined non-verbal cues, images of a user, triggering events, verbal phrases, vital signs of a user, and/or decorum preferences. Repository 144 is a logical aggregation of data from separate databases into a central location for a specific purpose. For example, storage device 142 may include a plurality of databases that include data that is associated with a non-verbal cue of a user that correlates to a triggering event, which masking program 200 analyzes and stores metadata of relationships between non-verbal cues and decorum preferences in repository 144.

In various embodiments, storage device 142 includes information associated with devices and users that have authorized the collection of information (i.e., users that have opted-in) that masking program 200 utilizes. In one scenario, an owner of client device 120 authorizes masking program 200 to access microphone 126 to collect and store audio data (e.g., speech, ambient noise, etc.) of client device 120. In another scenario, an owner of client device 120 authorizes masking program 200 to access camera 128 to collect and store video data (e.g., images) of client device 120. In another scenario, an owner of client device 120 authorizes masking program 200 to access sensor 129 to collect and store biometric data (e.g., vital signs) of client device 120.

Masking program 200 utilizes visual recognition to determine a non-verbal cue (e.g., facial expressions, gestures, body language, etc.) of a user in a video conference. In one embodiment, masking program 200 determines non-verbal cues of a user of a video conference. For example, masking program 200 detects that the eyebrows of a user are lower and closer together than when compared to a rest position, the lips of the user are narrower than when at an at rest position, and the eyes of the user fixed on a certain point.

Additionally, masking program 200 compares the detected actions to a catalog of actions stored in a database (e.g., storage device 142) and determines a user has a sad facial expression (e.g., non-verbal cue). In another example, masking program 200 detects that a user is putting the index finger and thumb of one hand together to form an o-shape with the remaining fingers raised, and determines the user is making a gesture (e.g., non-verbal cue) that shows the user is in agreement (e.g., okay). In yet another example, masking program 200 detects that the head of a user is angled downward, the eyes of the user are diverted away from another video conference participant, and the shoulders of the user are lower than the rest position. Additionally, masking program 200 determines that the body language the user is exhibiting is that of a sad person (e.g., non-verbal cue). In another embodiment, masking program 200 stores all determined non-verbal cues in storage device 142.

In another embodiment, masking program 200 uses visual recognition to identify participants in a video conference. For example, masking program 200 uses facial recognition techniques to identify all participants in a live video call stream. In yet another embodiment, masking program 200 utilizes visual recognition to detect potential disruptions and/or distractions of a user. For example, masking program 200 detects the presence of a person, not a participant to the live video call stream, and determines that a user may be distracted or disturbed by the presence of the person.

Masking program 200 can generate a substitute representation image of a user in a video conference. In one embodiment, masking program 200 utilizes video data of client device 120 in storage device 142 to generate a substitute representation image of a user. In another embodiment, masking program 200 generates a substitute representation image of a user upon initiation of a video conference using captured video data of the video conference stored in storage device 142. For example, masking program 200 can construct an image (e.g., an avatar, 3D image, etc.) of a user using images of video data of a live video call stream stored in a database (e.g., storage device 142). In another embodiment, masking program 200 generates a substitute representation image of the user where the substitute representation image is aligned to a current body alignment of the user in a video conference (e.g., an avatar overlaying the user in the video conference). For example, masking program 200 generates an avatar of the user with the arms of the user crossed to match the current body alignment of the user in a live video call stream.

Masking program 200 can utilize natural language processing (NLP) to analyze speech and ambient noise in the video conference. In one embodiment, masking program 200 utilizes NLP to detect spoken conversations of a user. For example, masking program 200 utilizes NLP (e.g., sentence splitting, tokenization, Part-Of-Speech (POS) tagging, chunking, dependency parsing, anaphora resolution, optical character recognition, etc.) to derive the content of conversations a user is a party to and/or identify ambient noise in the operating environment of a device of a user (e.g., mobile device, laptop, etc.). In another embodiment, masking program 200 stores phrases from conversations in storage device 142. For example, masking program 200 detects a user exhibits a facial expression (e.g., non-verbal cue) in response to a participant of a live video call stream directing a comment at the user. In this example, masking program 200 stores a phrase included in the comment in a triggering event phrases database (e.g., storage device 142) and stores correlation data about the facial expression and the phrase in a repository (e.g., repository 144).

In various embodiments of the present invention, masking program 200 determines a triggering event for a user that is derived from an analysis of data sources (e.g., messaging applications, social media applications, audio, profile information, etc.) that the user has authorized masking program 200 to utilize. In one scenario, a user of client device 120 authorizes masking program 200 to utilize all information and data sources that are available for masking program 200 to access. In another scenario, a user of client device 120 authorizes masking program 200 to utilize information included in a user profile of the user, (e.g., age, education, geographic region, etc.) but does not authorize masking program 200 to access content of a social media account to gather information corresponding to the user.

Masking program 200 utilizes data of application 124 of client device 120 to create a user profile of known and/or potential triggering events of non-verbal cues. For example, masking program 200 utilizes NLP and linguistic analytics to derive a profile of a user from text of social media post to determine behavioral and psychological traits for known triggers of non-verbal cues. In various embodiments of the present invention, masking program 200 determines a triggering event for a user, which is an occurrence of a set of conditions that cause the user to perform a non-verbal cue. In one embodiment, masking program 200 utilizes a user profile to detect triggering events and mask a correlated non-verbal cue of a user. For example, masking program 200 detects a known triggering event in the audio of a live video call stream based on a profile of a user. In this example, masking program 200 predicts the reaction of the user using a correlated relation of a repository to a defined excluded category and turns the camera (e.g., camera 128, camera 138, etc.) of the user off (i.e., masking the predicted non-verbal cue of the user that corresponds to a defined excluded category). In another example, masking program 200 utilizes a historical database of triggering events that have been correlated between things said and done (e.g., video data, audio data, biometric data, etc.) during a live video call stream that cause a user to perform a non-verbal cue. Additionally, masking program 200 can mask the non-verbal cue of the user with a 3D image and remove the 3D image when the non-verbal cue of the user is no longer present in the live video call stream.

In another embodiment, masking program 200 determines an action (e.g., mute audio, filter noise, etc.) for ambient noise that masking program 200 determines corresponds to a defined excluded category. For example, while a user is speaking on a microphone of a mobile device (e.g., client device 120) during a live video call stream, masking program 200 detects music playing and that the user is making a gesture to another individual to stop playing the music. Additionally, masking program 200 determines that the ambient noise is causing a disruption based on appropriateness preferences of a user (e.g., moderator, host, participant, etc.) of a laptop (e.g., client device 130) of the user and mutes the microphone of the mobile device (e.g., client device 120). In another example, masking program 200 can filter out the ambient noise so that only the voice of the user of the mobile device (e.g., client device 120) can be heard. In yet another embodiment, masking program 200 determines an action (e.g., turn video of a user on and off) for a non-verbal cue that masking program 200 determines corresponds to a defined excluded category.

In various embodiments, users authorize masking program 200 to utilize (i.e., users that have opted-in) information collected from client device 120 and client device 130. In one scenario, an owner of client device 120 authorizes masking program 200 to generate a substitute representation image of the owner using collected video data of client device 120. In another scenario, an owner of client device 120 authorizes masking program 200 to detect and determine non-verbal cues and triggering events using collected audio, video, and biometric data of the owner of client device 120. In another scenario, an owner of client device 120 authorizes masking program 200 to turn microphone 126 and camera 128 off and on while masking program 200 is in use during a video conference.

Figure 2:
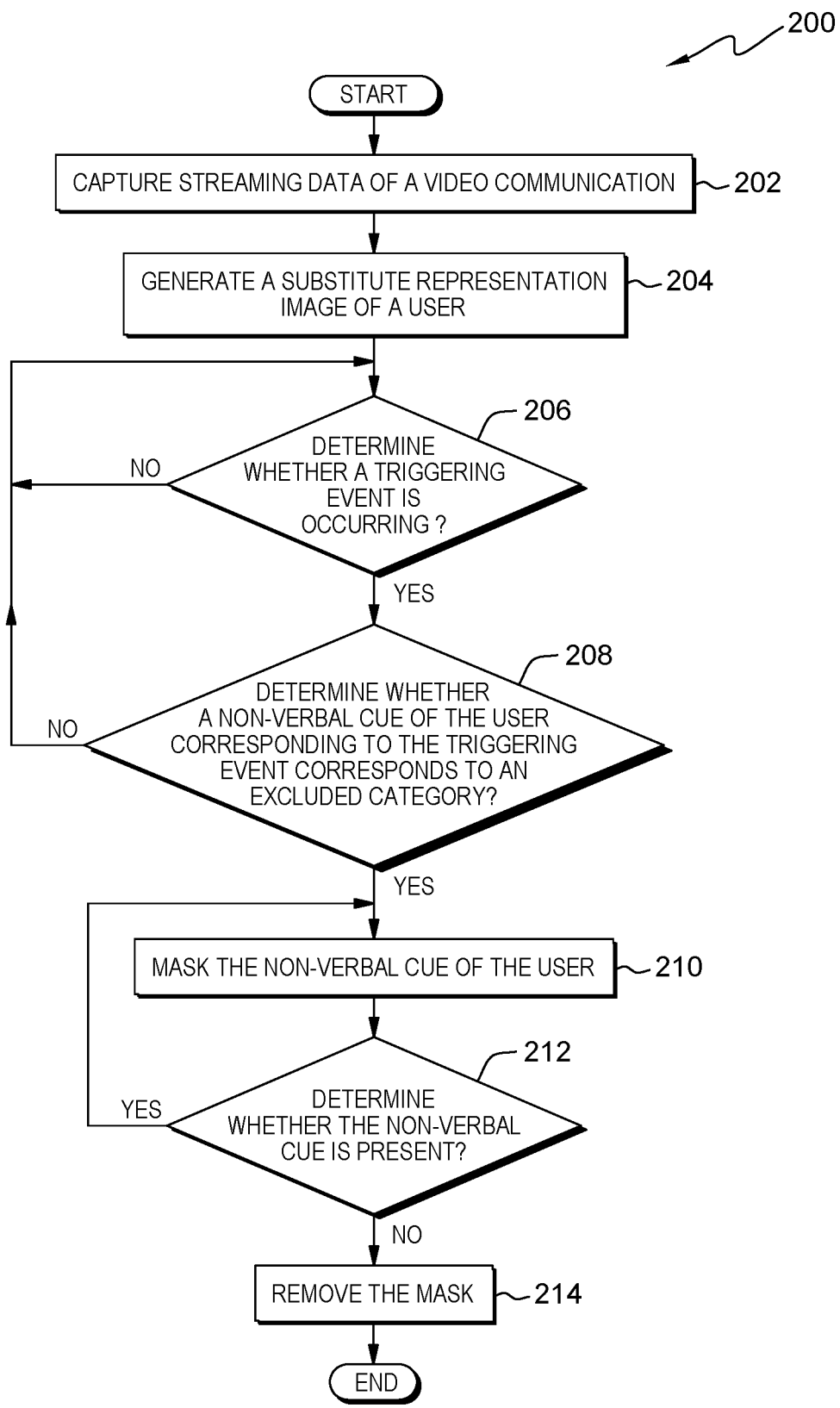
FIG. 2 is a flowchart depicting operational steps of a program for masking a non-verbal cue of a user in a video conference, in accordance with embodiments of the present invention.

FIG. 2 is a flowchart depicting operational steps of masking program 200, a program for masking a non-verbal cue of a user in a video conference, in accordance with embodiments of the present invention. In one embodiment, masking program 200 initiates in response to a user initiating a video conference using client device 120. For example, masking program 200 initiates in response to masking program 200 detecting a user opening a video conference program (e.g., application 124) on a mobile device (e.g., client device 120). In another embodiment, masking program 200 initiates in response to a user accessing a video conference using client device 130. For example, masking program 200 initiates in response to masking program 200 detecting a user connecting to a live video call stream through a video conferencing program (e.g., application 134) of a laptop (e.g., client device 130) of the user.

In step 202, masking program 200 captures streaming data of a video communication. In one embodiment, masking program 200 captures data of a video communication (e.g., a video conference) and a corresponding user. In another embodiment, masking program 200 utilizes camera 128 to capture images of a user and stores the images in storage device 142. For example, masking program 200 captures images of the face and body of a user when the user is at rest and also captures images of the user performing facial expressions and gestures (e.g., non-verbal cues). In this example, masking program 200 defines (e.g., labels, tags, etc.) the facial expressions of the user and stores the facial expressions in a non-verbal cues database (e.g., storage device 142). In another example, masking program 200 stores detected non-verbal cues that correspond to a user in a historical database of non-verbal cues to improve the accuracy of defined non-verbal cues. In another example, masking program 200 utilizes the captured images of multiple participants in a live video call stream and uses facial recognition techniques to identify the participants in the live video call stream.

In another embodiment, masking program 200 utilizes microphone 126 and client device 120 to capture audio of a user and a participant of a video conference (e.g., a presenter and an audience). For example, masking program 200 captures audio of a live video call stream and stores verbal phrases which lead to a user performing a facial expression or gesture (e.g., non-verbal cue) and stores the verbal phrases in a triggering event phrases database (e.g., storage device 142). In this example, masking program 200 utilizes NLP to analyze the phrases to improve the accuracy of non-verbal cue definitions (e.g., labels, tags, etc.) through developing context of a triggering event. In another example, masking program 200 detects ambient noise while a user is participating in a live video call stream, analyzes the ambient noise, and stores information (e.g., noise levels, noise types, etc.), which relates to a disruption and/or non-verbal cue of the user, in a database. In yet another example, masking program 200 utilizes captured audio of all of the participants of the live video call stream, and uses voice recognition techniques (e.g., speaker recognition) to identify the participants.

In yet another embodiment, masking program 200 utilizes sensor 129 to capture biometric data of a user. For example, masking program 200 captures vital signs of a user from a sensor (e.g., smart watch, fitness tracker, mobile device, etc.) prior to, during, and after a non-verbal cue of the user and stores the vital signs in a database. In this example, masking program 200 utilizes cognitive analytics to derive relationships between vital signs of the user and the non-verbal cue. In another example, masking program 200 detects that the heart rate, blood pressure, and respiration rate of a user increased significantly when the user makes a certain facial gesture (e.g., non-verbal cue) and stores the detected information in a historical database of defined facial expressions and gestures.

In step 204, masking program 200 generates a substitute representation image of a user. In one embodiment, masking program 200 utilizes images of a user stored in storage device 142 to generate a 3D model as a substitute representation image of the user. For example, masking program 200 constructs an avatar of a user using images captured from a live video call stream. In another embodiment, masking program 200 generates a 3D model of a user at the initiation of application 124. For example, masking program 200 detects that a user is initiating video conference software (e.g., application 124) on a mobile device (e.g., client device 120) and constructs a 3D image of a user in real-time using images of the user, which masking program 200 captures (e.g., via camera 128 and/or camera 138) from video data of a live video call stream. In yet another embodiment, masking program 200 utilizes a plurality of captured images of a user to construct a 3D image of the user. For example, masking program 200 constructs a 3D image of a user with the arms of the user folded using two-dimensional images captured from a video data of a live video call stream.

In decision step 206, masking program 200 determines whether a triggering event is occurring. In one embodiment, masking program 200 utilizes data of storage device 142 to determine whether the data of client device 120 includes a set of conditions that can cause a user to perform a non-verbal cue. For example, masking program 200 uses captured data (e.g., audio data, video data, biometric data, etc.) stored in a historical database (e.g., storage device 142) to determine whether a live video call stream includes a triggering event. In another embodiment, masking program 200 utilizes NLP to monitor audio data of client device 120 to detect data of a video conference correlated with data in storage device 142 to determine whether the audio data of client device 120 includes a set of conditions that can cause a user to perform a non-verbal cue. For example, masking program 200 utilizes NLP techniques to monitor audio of a live video call stream on a mobile device (e.g., client device 120) of a user and detects a comment that includes a phrase that is stored in triggering event phrases database (e.g., storage device 142). In this example, masking program 200 determines that the presence of the phrase in the detected comment satisfies a set of conditions of a triggering event and determines that the triggering event is occurring.

In another example, masking program 200 monitors ambient noise levels of audio of a live video call stream on a mobile device (e.g., client device 120) of a user and detects a recent increase in ambient noise (e.g., music playing in the background, talking, or general disruptions and/or distractions, etc.). In this example, masking program 200 determines that the recent increase in ambient noise and a gesture of the user satisfies a set of conditions of a triggering event and determines that the triggering event is occurring. In yet another example, masking program 200 monitors ambient noise levels of audio of a live video call stream on a mobile device (e.g., client device 120) of a user and detects the sound of a door opening in the ambient noise. In this example, masking program 200 determines that the door opening sound is an occurring triggering event based on the door opening sound being a precursor to the user being distracted (e.g., looking away from the camera) previously.

In another embodiment, masking program 200 monitors biometric data of sensor 129 and audio data of client device 120 to determine whether a set of conditions that can cause a user to perform a non-verbal cue are present. For example, masking program 200 monitors vital signs (e.g., biometric data) and audio of a live video call stream on a mobile device (e.g., client device 120) of a user and detects that the heart rate, blood pressure, and respiration rate of a user have increased significantly when masking program 200 detects a recent increase in ambient noise. In this example, masking program 200 determines that the increases in the vital signs of the user and the recent increase in ambient noise satisfies a set of conditions of a triggering event and determines that the triggering event is occurring.

In yet another embodiment, masking program 200 utilizes visual recognition and comparison mapping to monitor video data of client device 120 to detect non-verbal cues of a user in relation to data in storage device 142 and accordingly determine whether the video data of client device 120 includes a non-verbal cue. Additionally, masking program 200 determines a set of conditions that caused the user to perform the non-verbal cue and stores the conditions in storage device 142. For example, masking program 200 utilizes visual recognition to monitor video of a live video call stream on a mobile device (e.g., client device 120) of a user. In this example, masking program 200 tracks positions of the eyes of the user across multiple frames, creates a map of the movement, and compares the movement of the user to images of gestures (e.g., non-verbal cue) stored in a generic gesture database (e.g., storage device 142). Also, masking program 200 determines that the movement of the user is a gesture based on the comparison of the mapped images of the user and the data of the generic gesture database (e.g., storage device 142). Moreover, masking program 200 stores the triggering event (e.g., a set of conditions that cause the user to perform a non-verbal cue) and the corresponding gesture of the user in a historical database (e.g., storage device 142), with an association to the user.

In another example, masking program 200 uses past triggering events of a historical database (e.g., storage device 142) to detect a set of conditions that cause a user to perform a correlated non-verbal cue in a live video call stream prior to the non-verbal cue being present in the live video call stream (i.e., masking program 200 can predict event triggers in real-time). In yet another example, masking program 200 improves in accuracy of a historical database by increasing the number of non-verbal cues specific to a user, which correspond to specific triggering events, in a historical database (e.g., storage device 142). In this example, a non-verbal cue that masking program 200 determines using the historical database (e.g., storage device 142) supersedes a determination made using a generic gesture database (e.g., storage device 142).

If masking program 200 determines that a triggering event is not occurring (decision step 206, "NO" branch), then masking program 200 continues to monitor audio and video data of a video conference and a user of client device 120 for triggering events. For example, if masking program 200 determines that the streaming data of a live video call stream does not include one or more of the set of conditions of a triggering event, which indicates that the triggering event is not occurring, then masking program 200 continues to monitor the live video call stream of the mobile device (e.g., client device 120) of the user to detect a set of conditions of a triggering event.

In decision step 208, masking program 200 determines whether a non-verbal cue of the user that correlates to the triggering event corresponds to an excluded category. More specifically, in response to determining that a triggering event is occurring (decision step 206, "YES" branch), masking program 200 determines whether a non-verbal cue of the user that correlates to the triggering event corresponds to an excluded category. For example, when masking program 200 determines that the set of conditions of a triggering event are satisfied, then masking program 200 determines whether a gesture, facial expression, or body language (e.g., non-verbal cue) of the user that correlates to the triggering event corresponds to an excluded category.

In one embodiment, masking program 200 utilizes data of storage device 142 to define non-verbal cues that are within an excluded category of non-verbal cues, gestures, and/or actions. For example, masking program 200 utilizes a generic decorum database (e.g., storage device 142), which includes a plurality of actions that are defined to be associated with a category that is excluded from broadcast in a video conference based on environments, social norms and/or decorum. In such examples, masking program 200 can define (e.g., label, tag, etc.) a gesture, facial expression, or body language (e.g., non-verbal cue) detected in the video conference, in response to a triggering event. In another example, masking program 200 can utilize a generic appropriateness database (e.g., storage device 142), which includes a plurality of actions that are defined to be associated with a category that is proper for broadcast in a video conference based on a conduct policy of an entity. In such examples, masking program 200 can define (e.g., label, tag, etc.) a gesture, facial expression, or body language (e.g., non-verbal cue) detected in the video conference, in response to a triggering event.

In another embodiment, masking program 200 utilizes storage device 142 to determine whether a non-verbal cue (of decision step 206) corresponds to an excluded category by analyzing a reaction sequence of a user. For example, masking program 200 utilizes inputs captured, defined, and stored in a historical database (e.g., storage device 142) to perform an analysis of a facial expression, gesture, and body language of a user in response to a speaker in a live video call stream (or ambient noise). In this example, masking program 200 can determine whether content in the video conference corresponds to an excluded category based on the occurrence of a series of actions. In another embodiment, masking program 200 performs an analysis of data of storage device 142 to determine whether a non-verbal cue corresponds to an excluded category and can store the relationships in repository 144. For example, masking program 200 performs analysis on data stored in a non-verbal cue database associated with a particular user (e.g., in storage device 142), which can include facial expressions, gestures, and body language of a user. In this example, masking program 200 determines content of the analyzed data that corresponds to an excluded category and occurs in response to an act performed, a phrase said, and/or ambient noise (i.e., a reaction correlated to a triggering event). Accordingly, masking program 200 stores a specific triggering event and correlated reaction (e.g., non-verbal cues) in a repository. In such examples, masking program 200 can use the specific triggering events and reaction of a user to predict how a user may react in response to identification of a triggering event.

In another embodiment, masking program 200 utilizes data of storage device 142 to identify parties of a video communication to determine whether a non-verbal cue corresponds to an excluded category based on rank the identified party in a hierarchical chart. For example, masking program 200 uses facial recognition techniques to identify a participant of the video conference using previously captured images of the participant in a database. Additionally, masking program 200 identifies an excluded category based the position the participant holds in a company organization chart or previous interactions between the participant and the user. Thus, masking program 200 can determine a triggering event is occurring, but not mask the gesture because the gesture is not present in the excluded category of the identified participant based on previous interactions where the gesture did not cause a distraction.

If masking program 200 determines that a non-verbal cue of the user corresponding to the triggering event does not correspond to an excluded category (decision step 208, "NO" branch), then masking program 200 continues to monitor streaming data of a video conference of client device 120 for triggering events. For example, if masking program 200 determines that a gesture (e.g., using one hand, putting the index finger and thumb together to form an o-shape with the remaining fingers raised to show the user is in agreement with a participant in a video conference) corresponding to a triggering event is appropriate (i.e., proper based on environments, social norms and/or decorum), then masking program 200 continues to monitor a live video call stream of a mobile device (e.g., client device 120) of the user to detect a triggering event.

In step 210, masking program 200 masks the non-verbal cue of the user. More specifically, in response to determining that a non-verbal cue of the user corresponding to the triggering event does correspond to an excluded category (decision step 208, "YES" branch), masking program 200 masks the non-verbal cue of the user. For example, if masking program 200 determines that a gesture corresponds to an excluded category, then masking program 200 masks corresponding audio and/or video data of the video conference. In one embodiment, masking program 200 performs a determined action (e.g., mute audio, filter noise, utilize overlay with substitute representation, turn video of a user on and off, etc.) to mask a non-verbal cue of a user that corresponds to an excluded category. For example, masking program 200 mutes the microphone of the user so that the sound of the music playing in the background (e.g., ambient noise) can no longer distract the user or disturb the participant of the live video call stream using the laptop (e.g., client device 130). In another example, masking program 200 identifies the ambient noise (e.g., audible sounds that distort sound of the voice of the user) detected by the microphone (e.g., microphone 126) of the mobile device (e.g., client device 120) of the user and filters the ambient noise so that the voice of the user is heard with minimal distortion from the background noise. In another example, masking program 200 can turn off the camera (e.g., camera 128) of the mobile device (e.g., client device 120) of the user to prevent participants of the live video call stream from seeing an action that corresponds to an excluded category (e.g., a person walking into the frame).

In another embodiment, masking program 200 utilizes the generated 3D image (of step 204) from storage device 142 to mask a non-verbal cue of a user. For example, masking program 200 uses a video overlay to place the generated 3D image of the user in a layer of the video of the live video call stream, which covers the facial expression of the user (e.g., non-verbal cue) in response to a participant laughing, which may distract the user presented. In another example, masking program 200 generates a plurality of 3D images of the user in varying body orientations, which masking program 200 can are align with the body of the user and movements. In this example, masking program 200 can replace frames of the live video call stream that include the facial expression of the user (i.e., the non-verbal cue).

In decision step 212, masking program 200 determines whether the non-verbal cue is present. In one embodiment, masking program 200 monitors video of the user to determine whether the detected non-verbal cue is apparent in the video of the user. For example, masking program 200 utilizes the microphone the mobile device (e.g., client device 120) of the user to determine whether the child of the user continues to play music (e.g., ambient noise) in the background. In another example, masking program 200 utilizes visual recognition to detect whether the user is facing the camera in frames of the live video call stream.

If masking program 200 determines that the detected non-verbal cue is present in the video conference of the user (decision step 212, "NO" branch), then masking program 200 continues to mask the non-verbal cue of the user. For example, if masking program 200 determines that that the background music is still playing (e.g., ambient noise), then masking program 200 continues to mute the microphone of the user. In another example, if masking program 200 determines that the facial expression of the user is visible in frames of the live video call stream, then masking program 200 continues to mask the facial expression of the user present in the video of the live video call stream with the generated 3D image of the user.

In step 214, masking program 200 removes the mask. More specifically, in response to determining that the detected non-verbal cue is no longer present in the video conference of the user (decision step 212, "YES" branch), masking program 200 removes the mask from the user. For example, when masking program 200 determines that a detected gesture and/or ambient noise that corresponds to an excluded category is no longer present, then masking program 200 removes the mask of the audio and/or video data of the live video call stream. In one embodiment, masking program 200 ceases to perform a determined action (e.g., mute audio, filter noise, utilize overlay with substitute representation, turn video of a user on and off, etc.) to mask audio and/or video data of a video conference. For example, masking program 200 unmutes the microphone of a mobile device of a user so that the user can speak in a live video call stream. In another example, masking program 200 can turn back on a camera (e.g., camera 128) of a mobile device (e.g., client device 120) of a user on again to allow the user to be visible to other participants in a live video call stream.

In another embodiment, masking program 200 removes the generated 3D image (of step 204 and step 210) of storage device 142 from the user in the video conference. For example, masking program 200 uses a video overlay to remove a generated 3D image of a user from a layer of the video of the live video call stream, which covered the facial expression (e.g., non-verbal cue) of the user. In another example, masking program 200 generates a plurality of 3D images of the user in varying body orientations, which are aligned with the body of the user and movements. In this example, masking program 200 can gradually reduce the opacity of frames in the overlay until the user is completely visible (i.e., opacity of the overlay is at 0% out of 100%).

Figure 3:
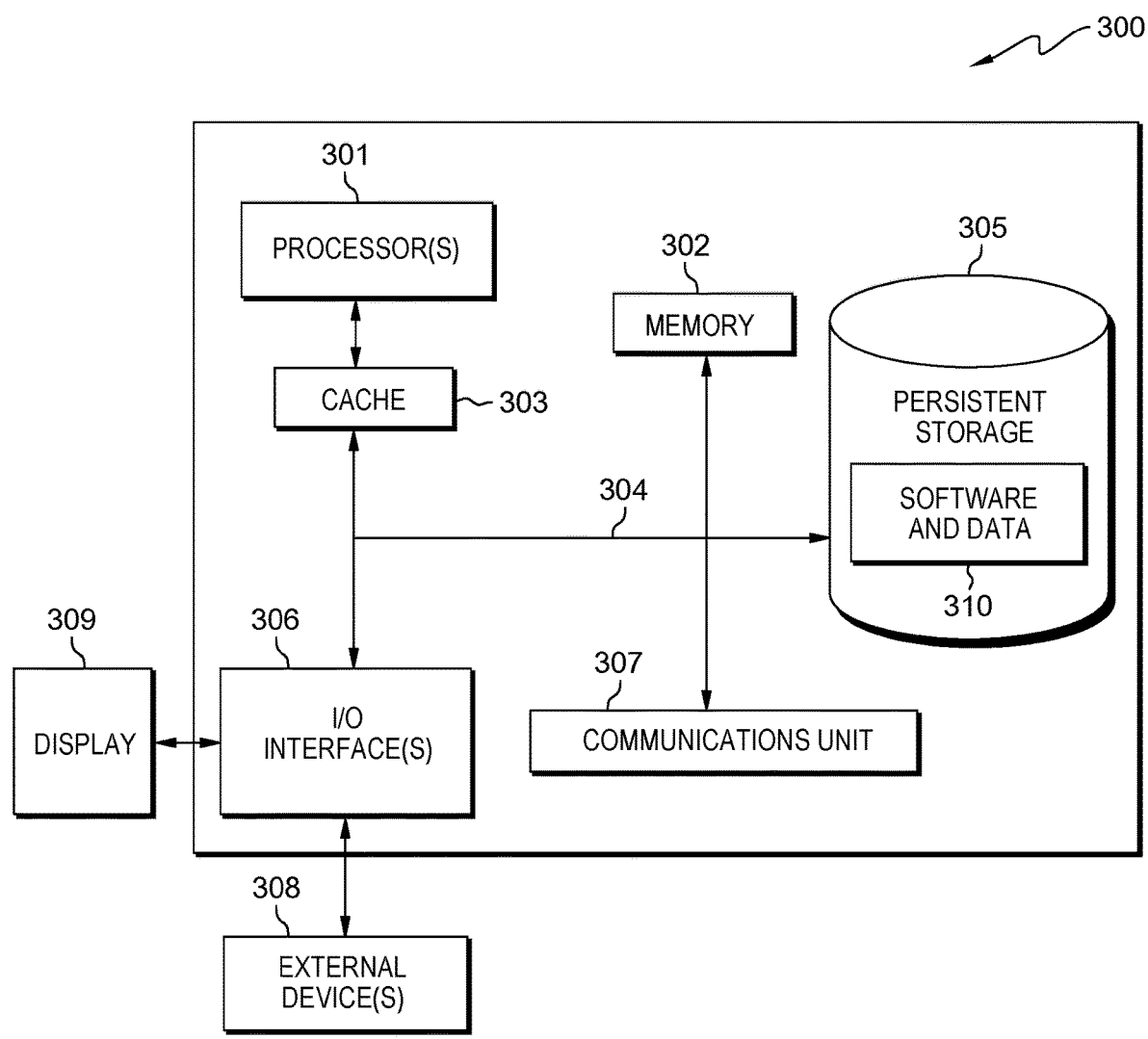
FIG. 3 depicts a block diagram of components of a computing system representative of the server of FIG. 1, in accordance with an embodiment of the present invention.

FIG. 3 depicts computer system 300, which is representative of client device 120, client device 130, and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made. Computer system 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 130, software and data 310 includes data of application 134, microphone 136, camera 138, and sensor 139. With respect to server 140, software and data 310 includes masking program 200 and data of storage device 142 and repository 144. With respect to client device 120, software and data 310 includes data of application 124, microphone 126, camera 128, and sensor 129.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, a microphone, a camera, a sensor, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    identifying, by one or more processors, a user within streaming data of a video communication;
    determining, by one or more processors, a triggering event is present in the streaming data of the video communication, wherein the triggering event is an occurrence of a set of conditions that cause the user to perform a non-verbal cue;
    in response to determining that the triggering event is present in the streaming data of the video communication, identifying, by one or more processors, the non-verbal cue by the user included in the streaming data of the video communication;
    determining, by one or more processors, whether the identified non-verbal cue corresponds to an excluded category of actions for the video communication; and
    in response to determining that the identified non-verbal cue corresponds to an excluded category of actions for the video communication, masking, by one or more processors, the identified non-verbal cue by overlaying a substitute representation of the user over the user in the streaming data of the video communication.

2. The method of claim 1, wherein masking the identified non-verbal cue by overlaying a substitute representation of the user over the user in the streaming data of the video communication further comprises:
    selecting, by one or more processors, one or more images of the user from the streaming data of the video communication using visual recognition;
    generating, by one or more processors, a three-dimensional model image of the user using the one or more images of the user from the streaming data of the video communication; and
    overlaying, by one or more processors, the generated three-dimensional model image of the user in alignment with a current body position of the user in the streaming data of the video communication.

3. The method of claim 2, further comprising:
    in response to determining the identified non-verbal cue corresponding to the excluded category of actions for the video communication is no longer present, removing, by one or more processors, the overlay that includes the three-dimensional model image of the user from the streaming data of the video communication.

4. The method of claim 1, further comprising:
    identifying, by one or more processors, the triggering event in the streaming data of the video communication, wherein the triggering event in the streaming data of the video communication correlates to the identified non-verbal cue of the user; and
    masking, by one or more processors, the identified non-verbal cue of the user that corresponds to the excluded category of actions for the video communication based on the triggering event.

5. The method of claim 1, wherein masking the identified non-verbal by overlaying a substitute representation of the user over the user in the streaming data of the video communication further comprises:
    performing, by one or more processors, a masking action, the masking action selected from a group consisting of: muting audio of the user, filtering ambient noise from audio of the user, and turning off a video stream of the user.

6. The method of claim 1, wherein the substitute representation of the user is a plurality of varying three-dimensional model images of the user in a sequence that depicts the user in a rest position.

7. The method of claim 1, wherein the excluded category of actions of the video communication is a defined group of behaviors not intended for depiction in the video communication, based at least in part on a historical analysis of a reaction sequence of historical users from captured streaming data.

8. The method of claim 1, wherein the triggering event is selected from a group consisting of: verbal phrases and features of ambient noise.

9. A computer program product comprising:
    one or more computer readable storage media and program instructions stored on the one or more computer readable storage media, the program instructions comprising:
    program instructions to identify a user within streaming data of a video communication;
    program instructions to determine a triggering event is present in the streaming data of the video communication, wherein the triggering event is an occurrence of a set of conditions that cause the user to perform a non-verbal cue;
    in response to determining that the triggering event is present in the streaming data of the video communication, program instructions to identify the non-verbal cue by the user included in the streaming data of the video communication;

program instructions to determine whether the identified non-verbal cue corresponds to an excluded category of actions for the video communication; and in response to determining that the identified non-verbal cue corresponds to an excluded category of actions for the video communication, program instructions to mask the identified non-verbal cue by overlaying a substitute representation of the user over the user in the streaming data of the video communication.

10. The computer program product of claim 9, wherein the program instructions to mask the identified non-verbal cue by overlaying a substitute representation of the user over the user in the streaming data of the video communication, further comprise program instructions to:

select one or more images of the user from the streaming data of the video communication using visual recognition;

generate a three-dimensional model image of the user using the one or more images of the user from the streaming data of the video communication; and overlay the generated three-dimensional model image of the user in alignment with a current body position of the user in the streaming data of the video communication.

11. The computer program product of claim 10, further comprising program instructions, stored on the one or more computer readable storage media, to:

in response to determining the identified non-verbal cue corresponding to the excluded category of actions for the video communication is no longer present, remove the overlay that includes the three-dimensional model image of the user from the streaming data of the video communication.

12. The computer program product of claim 9, further comprising program instructions, stored on the one or more computer readable storage media, to:

identify the triggering event in the streaming data of the video communication, wherein the triggering event in the streaming data of the video communication correlates to the identified non-verbal cue of the user; and mask the identified non-verbal cue of the user that corresponds to the excluded category of actions for the video communication based on the triggering event.

13. The computer program product of claim 9, wherein the substitute representation of the user is a plurality of varying three-dimensional model images of the user in a sequence that depicts the user in a rest position.

14. The computer program product of claim 9, wherein the excluded category of actions of the video communication is a defined group of behaviors not intended for depiction in the video communication, based at least in part on a historical analysis of a reaction sequence of historical users from captured streaming data.

15. A computer system comprising:
one or more computer processors;
one or more computer readable storage media; and
program instructions stored on the computer readable storage media for execution by at least one of the one or more processors, the program instructions comprising:

program instructions to identify a user within streaming data of a video communication;

program instructions to determine a triggering event is present in the streaming data of the video communication, wherein the triggering event is an occurrence of a set of conditions that cause the user to perform a non-verbal cue;

in response to determining that the triggering event is present in the streaming data of the video communication, program instructions to identify the non-verbal cue by the user included in the streaming data of the video communication;

program instructions to determine whether the identified non-verbal cue corresponds to an excluded category of actions for the video communication; and in response to determining that the identified non-verbal cue corresponds to an excluded category of actions for the video communication, program instructions to mask the identified non-verbal cue by overlaying a substitute representation of the user over the user in the streaming data of the video communication.

16. The computer system of claim 15, wherein the program instructions to mask the identified non-verbal cue by overlaying a substitute representation of the user over the user in the streaming data of the video communication, further comprise program instructions to:

select one or more images of the user from the streaming data of the video communication using visual recognition;

generate a three-dimensional model image of the user using the one or more images of the user from the streaming data of the video communication; and overlay the generated three-dimensional model image of the user in alignment with a current body position of the user in the streaming data of the video communication.

17. The computer system of claim 16, further comprising program instructions, stored on the one or more computer readable storage media, to:

in response to determining the identified non-verbal cue corresponding to the excluded category of actions for the video communication is no longer present, remove the overlay that includes the three-dimensional model image of the user from the streaming data of the video communication.

18. The computer system of claim 15, further comprising program instructions, stored on the one or more computer readable storage media, to:

identify the triggering event in the streaming data of the video communication, wherein the triggering event in the streaming data of the video communication correlates to the identified non-verbal cue of the user; and mask the identified non-verbal cue of the user that corresponds to the excluded category of actions for the video communication based on the triggering event.

19. The computer system of claim 15, wherein the program instructions to mask the identified non-verbal by overlaying a substitute representation of the user over the user in the streaming data of the video communication, further comprise program instructions to:

perform a masking action, the masking action selected from a group consisting of: muting audio of the user, filtering ambient noise from audio of the user, and turning off a video stream of the user.

20. The computer system of claim 15, wherein the excluded category of actions of the video communication is a defined group of behaviors not intended for depiction in the video communication, based at least in part on a historical analysis of a reaction sequence of historical users from captured streaming data.

* * * * *